(12) United States Patent
Schwartz et al.

(10) Patent No.: US 6,185,531 B1
(45) Date of Patent: Feb. 6, 2001

(54) TOPIC INDEXING METHOD

(75) Inventors: Richard M. Schwartz, Sudbury, MA (US); Toru Imai, Tokyo (JP)

(73) Assignee: GTE Internetworking Incorporated, Cambridge, MA (US)

( * ) Notice: Under 35 U.S.C. 154(b), the term of this patent shall be extended for 0 days.

(21) Appl. No.: 09/005,960

(22) Filed: Jan. 9, 1998

Related U.S. Application Data

(60) Provisional application No. 60/034,659, filed on Jan. 9, 1997.

(51) Int. Cl.$^7$ .................................. G10L 5/06; G10L 9/00
(52) U.S. Cl. ........................ 704/256; 704/251; 704/240; 704/236; 707/6
(58) Field of Search .................................. 704/256, 251, 704/240, 236; 707/6

(56) References Cited

U.S. PATENT DOCUMENTS

| | | | |
|---|---|---|---|
| 5,625,748 | * 4/1997 | McDonough | 704/251 |
| 5,687,364 | * 11/1997 | Saund | 707/6 |
| 5,918,236 | * 6/1999 | Wical | 707/500 |

OTHER PUBLICATIONS

Larry Gillick et al., "Application of Large Vocabulary Continuous Speech Recognition to Topic and Speaker Indentification Using Telephone Speech," Proc. of 1993 IEEE International Conference on Acoustics, Speech, and Signal Processing (ICASSP), Miineapolis, MN, pp. 471–474, Apr. 27–30, 1993.

R.C. Rose et al., "Techniques for Information Retrieval from Voice Messages," Proc. ICASSP–91, Toronto, Canada, pp. 317–320, May 1991.

John Makhoul and Richard Schwartz, "State of the Art in Continuous Speech Recognition," Proc. Natl. Acad. Sci. USA, vol. 92, pp. 9956–9963, Oct. 1995.

Barbara Peskin et al., "Improvements in Switchboard Recognition and Topic Identification," Proc. 1996 IEEE International Conference on Acoustics, Speech & Signal Processing (ICASSP), Atlanta, GA, May 7–10, 1996, pp. 303–306.

* cited by examiner

*Primary Examiner*—Fan Tsang
*Assistant Examiner*—Robert Louis Sax
(74) *Attorney, Agent, or Firm*—Leonard Charles Suchyta

(57) ABSTRACT

A method for improving the associating articles of information or stories with topics associated with specific subjects (subject topics) and with a general topic of words that are not associated with any subject. The inventive method is trained using Hidden Markov Models (HMM) to represent each story with each state in the HMM representing each topic. A standard Expectation and Maximization algorithm, as are known in this art field can be used to maximize the expected likelihood to the method relating the words associated with each topic to that topic. In the method, the probability that each word in a story is related to a subject topic is determined and evaluated, and the subject topics with the lowest probability are discarded. The remaining subject topics are evaluated and a sub-set of subject topics with the highest probabilities over all the words in a story are considered to be the "correct" subject topic set. The method utilizes only the positive information and words related to other topics are not taken as negative evidence for a topic being evaluated. The technique has particular application to text that is derived from speech via a speech recognizer or any other techniques that results in a text file. The use of a general topic category enhances the results since most words in any story are not keywords that are associated with any given subject topic. The removal of the general words reduces the numbers of words being considered as keywords related to any given subject topic. The reduced number of words being processed allows the method to enhance the discrimination between the fewer words as related to the subject topics. The topics can range from general, for example "the U.S. economy", to very specific, for example, "the relationship of the yen to the dollar in the U.S. economy."

26 Claims, 3 Drawing Sheets

TOPIC INDEXING METHOD

RELATED APPLICATIONS

Priority is claimed under 35 U.S.C. §119 (e) for the present invention from a U.S. Provisional Application Ser. No. 60/034,659 filed on Jan. 9, 1997 of the same title and inventors as the present application.

FIELD OF INVENTION

This invention generally relates to automatically relating a story to a number of topics. Herein "story" is defined to include any article of information that may be presented to the inventive method, usually from a stored file. More particularly, the present invention relates to automatically indexing and associating stories to a concurrent number of topics ranging from broad to very detailed topics. The present invention is particularly well suited to be combined with voice to text converters, optical readers, and fax encoded data wherein the story (text) is automatically indexed to one or more topics or categories.

BACKGROUND OF INVENTION

Electronic news sources, including radio, television, cable, and the Internet have vastly increased the amount of information available to the public. Government agencies and businesses depend on this information to make informed decisions. In order to quickly access a particular type of information, it is important that this information be indexed according to topic type or subject. Topics of interest may be broadly defined, for example the U.S. President, or more narrowly defined, for example the U.S. President's trip to Russia. Manual sorting methods require excessive time and provide a limited number of topics with limited scope.

Automatic methods have been developed that transcribe and index and relate each story to one or more topics. These techniques typically model a topic by counting the number of times each word is used within a story on a known topic. To classify a new story, the relative frequencies of all the words in that story related to each topic are multiplied together. The topic with the highest product is selected as the "correct" topic. A limitation of such methods is that most words in a story are not "about" that topic, but just general words. In addition, real stories have several topics and these prior art methods assume that each word is related to all the various topics. In particular, classification of all words in a story create a limitation because a keyword (a word that is related to a topic) for one topic becomes, in effect, a negative when the keyword is classified (albeit with low probability) for another legitimate topic. This is a particular limitation of the prior art techniques. The result is that these prior art techniques have limited ability to discriminate among the various topics which, in turn, limits the accuracy with which stories can be indexed to any particular topic. One example of a prior art technique for automatic story indexing against subject topics is described in a paper entitled, *Application of Large Vocabulary Continuous Speech Recognition to Topic and Speaker Identification Using Telephone Speech,* by Larry Gillick, et al. from the Proceedings ICASSP-93, Vol. II, pages 471–474, 1993.

It is an object of the present invention to provide a method that acknowledges that there are generally several topics within any given story and that any particular word need not be related to all the topics, while providing for multiple topics and their related words.

It is another related object of the present invention to realize that many, if not most, words used in a story are not related to any topic but are words used in a general sense.

An object of the present invention is to provide a method where there is reduced overlap between the various topics within any one story.

It is yet another object of the present invention to provide a method of improved accuracy of topic identification.

It is yet another object of the present invention to improve topic identification by automatically determining which keywords relate to which topics, and then using those keywords as positive evidence for their respective topics, but not as negative evidence for other topics.

SUMMARY OF THE INVENTION

The foregoing objects are met in a superior method for indexing and relating topics to a story including representing each topic as having a probability that any word in a story may be related to the particular topic. However, the present method provides for the realization that not all words in a particular story are related to a given topic or topics within that story—some words are not related to any topic. The present method provides for a general topic category for those words, and hereinafter the use of "subject topic" is used to distinguish this general topic category. Usually, most of the words in a story fall into the general topic category thereby reducing the number of words that are keywords related to any given subject topic. This reduction simplifies and enhances the efficiency of finding keywords related to the various subject topics. In a preferred embodiment the subject topics for a story are modeled as states within a Hidden Markov Model with probabilities that story words are related to the subject topics.

The inventive method requires a training set of stories, where each story has been associated with several subject topics by a human annotator, based on the content within the story. Some of the subject topics may be very broad, like "money" or "politics" while others may be very detailed, like "U.S. Foreign Aid to Mexico" or "Election Campaign in Japan", and others may be names of specific people or companies or locations.

The inventive method compiles a list of (the union of) all topics used for all the training stories. The topic "General Language" is an added topic for every story. Then, by examining all the stories, words, and topics, the inventive method determines the probability that each word will be used for each topic, as well as the prior probabilities of each of the subject topics and sets of subject topics. This is accomplished using the Expectation-Maximization (EM) algorithm in an iterative fashion to maximize the likelihood of the words in the stories, given the subject topics.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
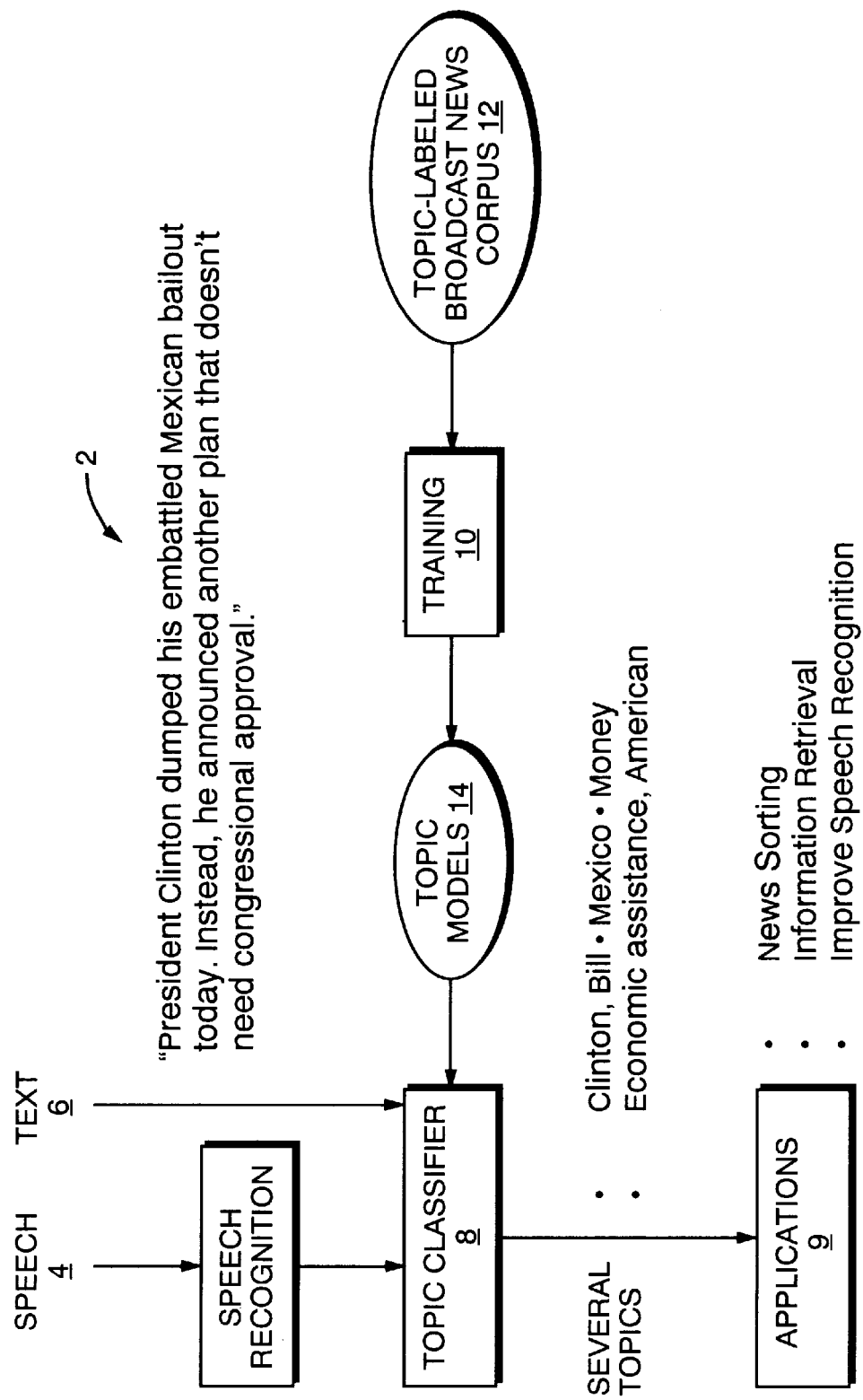
FIG. 1 is a block diagram of the inventive process.

FIG. 1 shows the application of the present inventive method in a practical application. The text 2 may be spoken 4 and reduced to text via a speech recognizer, scanned in from any of the known optical readers, or by any such techniques where text is the result. Such speech to text recognition systems are available in the art. The paper entitled, *STATE OF THE ART IN CONTINUOUS SPEECH RECOGNITION,* by John Makhoul and Richard Schwartz, published in the *Proc. Natl. Acad. Sci, USA*, Vol. 92, pp 99565–9963, Oct. 1993 describes speech recognition and the Hidden Markov Model (HMM) method, and this paper is hereby incorporated by references herein as if laid out in full. Alternatively, the text 6 may be entered directly or via an optical reader or a communications port. The system may be embodied in any suitable computer system as is known in the art, and the text is usually stored in the computer's memory. The text can be from virtually any source, for example a speech to text converter as noted above. It is clear to those skilled in the art that the inventive software can be implemented in digital logic and/or computer system hardware, including means for compiling topic sets, topic classifiers, topic models, various output formats, means for relating the words, topics and stories in both training the system and generating the models and in the use of the invention to determine and discriminate topics from an unknown story. However, real time applications, maybe using temporary storage, may be designed, especially for speech, where the hardware and software is fast enough to classify the topics in the speech. See the above Makhoul et al. paper. The text is examined by a topic classifier 8 which outputs the subject topics related to the text. That subject topic classification is useful for any endeavor where information related to any given topic is to be retrieved. Several applications 9 where the present invention would be useful include: news sorting, general information retrieval, and information retrieval used for feedback to improve expert or other such learning systems, for example, speech recognition. The topic models 14 are trained 10 by a set of stories 12 that have been manually indexed to specific topics. The training algorithm is the well known EM algorithm (see below) used iteratively to improve the parameters of the HMM probability models 14. The classification 8 operates as described below by examining each word in a story to determine which subject topic models 14, if any (if not any then the topic determined is the general topic which is not used by the topic classifier 8), that word is likely to be associated. The set of subject topics with the highest likelihood are output from the classifier 8.

Figure 2:
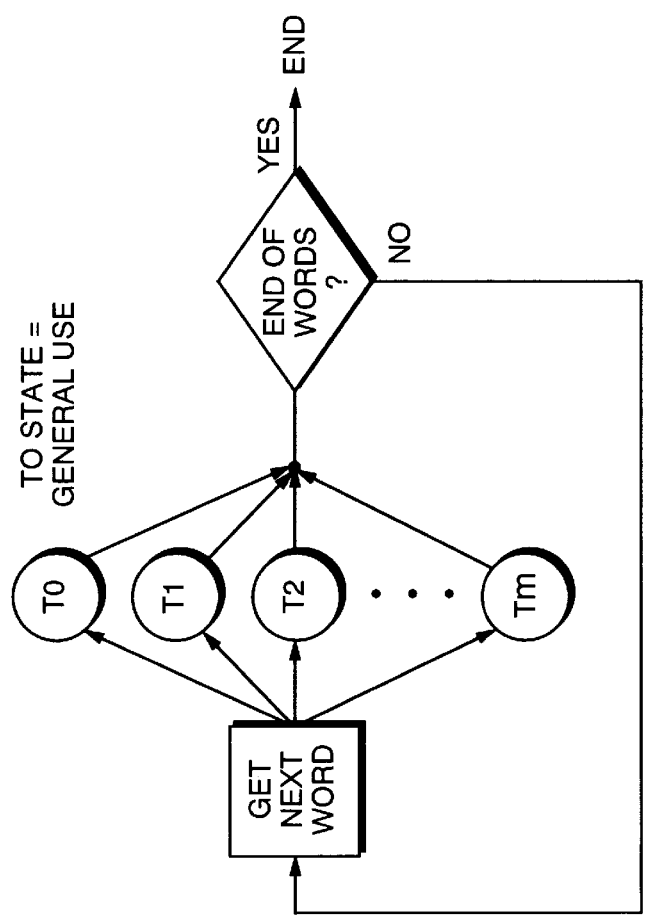
FIG. 2 is a flow chart of the inventive process.

FIG. 2 is a flow chart model of the present system of the topic models 14 wherein there is a topic model T0 for general words that are not related to any subject topic. The term subject topic is used to describe those topic models used by the classifier as compared to the general topic model that is not used by the classifier. FIG. 2 is a mixture model of topics where each model is an HMM where the transitions between states are independent from previous states. Each word taken in turn in a story is related to each HMM and the topic states with high probability of relating to that word are determined. For many or most words in a story the only HMM state with high probability will be T0, or the general model which is discarded and not used by the topic classifier. After each word is scored, the system loops back to the beginning and the next word is taken and applied to all the HMM topics. In this way all the words are processed independently until all the words in the story have been processed.

The models are trained applying an EM algorithm as known in the art. For example, one such algorithm may be found in a paper entitled, *A Maximization technique Occurring in the Statistical Analysis of Probabilistic Functions of Markov Chains,* by L. E. Baum, published in the *Ann. Math. Stat.*, Vol. 41, pages 164–171, 1970. The EM algorithm maximizes the expected likelihood of the training stories. With word independency assumed, the objective function is:

$$\prod_i P(Story_i | Set_i) = \prod_i \prod_t P(W_{it} | Set_i) \quad (1)$$

where $Set_i$ is a set of labeled topics of story i, and $w_{it} \in \{W_n\}$ is the $t^{th}$ word in the story i.

The probability of a word $w_{it}$ given the correct topic is:

$$P(w_{it} | set_i) = \frac{\sum_{j \in set_i} p(k_j | set) \cdot p(w_{it} | k_j)}{\sum_{j \in set_i} p(k_j | set)}$$

To train this model, the count for each word $w_n$ is distributed among the labeled topics, and the count is summed over the training stories.

$$c(w_n, k_j) = \sum_i \sum_t \delta_{w_i, w_{it}} \frac{p(k_i | set) \cdot p(w_{it} | k_j)}{\sum_{j \in set_i} (k_j | set) \cdot p(w_{it} | k_j)}$$

where $\delta$ demotes the Kronecker delta function.

The models, $p(w_n/k_j)$ and $p(k_j/set)$ are re-estimated from $c(w_n, k_j)$ iteratively.

$$P(w_n | k_j) = c(w_{nj} k_j) / \sum_n c(w_n, k_j) \quad (4)$$

$$P(k_j) = \sum_n c(w_{nj} k_j) / \sum_n \sum_j c(w_n, k_j) \quad (5)$$

when the likelihood (1) converges after iteratively applying the EM algorithms the training stops.

Since (5) gives the keyword probability about topic j given any story, equation (5) is converted to a keyword probability about a topic given "a story about topic j" according to $$p(k_j) \leftarrow \frac{p(k_j) \cdot (\text{\# word in all stories})}{\text{\# word in stories about topic } j} \quad (6)$$

The topic classification task is determining which of the possible thousands of topics, in addition to the general topic, produced a new unclassified story.

In principle, to recognize the most likely set of topics, set, for an unclassified story, the probability for all possible sets must be considered, and for each one the following is calculated:

$$\approx p(set) \prod_t \frac{\sum_{j \in set} p(k_j) \cdot p(w_t | k_j)}{\sum_{j \in set} p(k_j) \cdot p(w_t)} \quad (7)$$

To calculate (7) for all sets of topics is unreasonable due to the large number of combinations and the time that would be required to compute the results. Instead, each topic is first independently evaluated using $$\log P(T_j \mid \text{story}) = \log P(T_j) + \sum_t f\left(\log\left(\frac{p(k_j)^b \cdot p(w_t \mid k_j)}{p(w_t)}\right)\right) \qquad (8)$$

where b is a weighting parameter, and f is a filter, $f(x)=x$ $(x>\theta)$ or $\theta(x\leq\theta)$, which extracts positive information only in order to avoid the negative effects of words from other topics in the story.

After the individual evaluation and sorting, to find the best topic set among the top (N) topics, all possible 2N-1 sets of topics are evaluated by equation (7) (for small N this is not expensive). Then the topic set that gives the best score is regarded as the retrieved topics from the story.

The probability of a topic set in equation (7) is approximated by the co-occurrence probabilities of each pair of topics in the training stories with smoothing by padding, as follows:

$$p(set) = \prod_{l \in set} \prod_{m \in set(m>l)} (p(T_l, T_m))^{\frac{1}{N_{c2}}}$$

The invention may be better understood as illustrated in the following examples. Further, although the present invention is described with reference to the following examples, it should be noted that the invention is not limited to the examples provided herein.

EXAMPLE I

In applying the present invention to English stories, function words and pronouns like "the" and "he'll" are eliminated from the vocabulary according to a list of 215 English words. Suffixes are eliminated as is well known in the art. Topics had about 3,000 distinct words in the training stories, derived from training stories having a total of about 42,000,000 words, with about 95,600 unique word stems. The training stories were derived from manually transcribed and hand labeled topics from the TV and radio broadcast field over the years from 1992 to 1996. An EM algorithm as described above was used iteratively to modify the probability distributions to maximize the likelihood of the topics and the words in the stories according to the model. The tables A, B, C, and D (not included) were created and showed the results against prior art topic spotting techniques. Table A showed the prior probabilities that some topics will occur in a story. Table B showed for a conventional model the conditional probability for several words, given that one of the topics is "Clinton, Bill". Note that, while "president" and "Clinton" were likely, so were many general words like "go" and "think". Table C for the inventive method, showed the probability that each topic will produce a keyword given a story that is related to the topic. Table D-showed the probability of the words given that the topic "Clinton, Bill" produced a keyword. The relevant keywords were 8 to 10 times more likely, while the relatively general words like "go" or "think" had much lower probabilities than their probabilities given by the prior art model.

Figure 3:
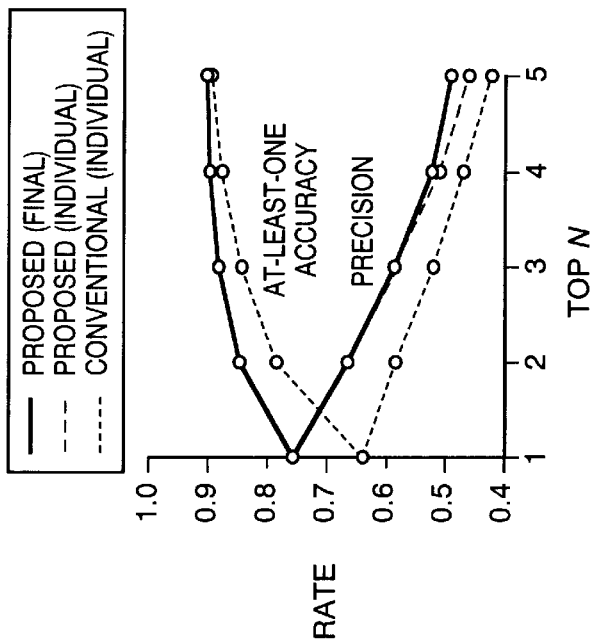
FIG. 3 is a graph of the precision and the probability that at least one topic is correct when scoring topics independently.

FIG. 3 is a graph showing the precision and the probability that at least one topic is correct when scoring topics independently. Precision is the fraction of correctly retrieved topics over all retrieved topics. The inventive method achieved a precision of 0.757 for the first choice compared to the prior art precision of 0.636. The inventive method also retrieved a greater fraction of the top five topics, termed "recall", compared to the prior art techniques (0.507 compared to 0.468).

Precision and recall generally will vary inversely with each other. In order to decide how many topics should be answered from each story, after the individual topic evaluations, the top 5 topics plus the general topic are re-scored jointly and the most likely set of topics is chosen.

EXAMPLE 2

Figure 4:
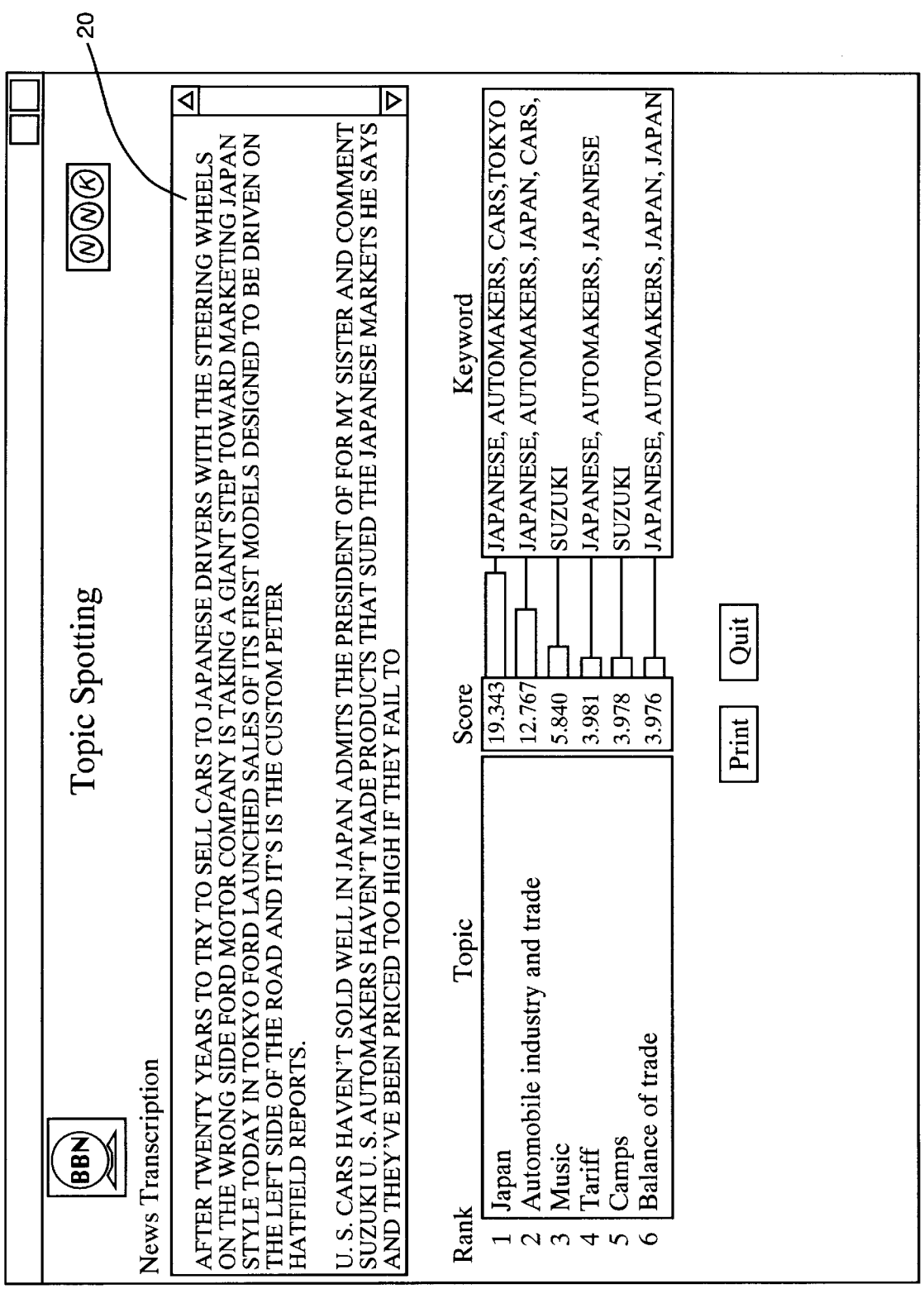
FIG. 4 is an example of the application of an inventive method to actual text.

FIG. 4 shows the results of associating topics with text. The text is found in the window 20 and the inventive method was applied to this text. The text is relevant to the six topics shown in the lower left window. The lower right window shows the keyword(s) relevant to the six topics with the scores found by the inventive method.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A method of topic determination and discrimination of stories composed of words, said method comprising the steps of:
   compiling a first set of topics;
   obtaining prior probabilities for each topic in said first set of topics;
   for all words in a story, determining probabilities associating each word in said story with each topic of said first set of topics, yielding word probabilities;
   responsive to said individual topic probabilities, determining probabilities of all possible combinations of topics from said first set of topics associated with said story, yielding a posterior probability for each combination of topics from said first set of topics; and
   choosing a combination of topics from said first set of topics having the highest posterior probability.

2. The method as defined in claim 1 further comprising the steps of:
   determining that some words in said story are not related to any topic in said first set of topics; and
   determining that other words in said story are related to one or more different topics in said first set of topics.

3. The method as defined in claim 1 wherein determining word probabilities comprises the steps of:
   performing the following steps for each combination of topics from said first set of topics;
      summing, over the topics in the combination, the probabilities that a particular word is associated with each topic of said combination, yielding summed probabilities; and
      multiplying said summed probabilities by said posterior probability for the combination of topics, said multiplying resulting in a score for that combination of topics from said first set of topics.

4. The method as defined in claim 1 further comprising the steps of: independently determining the probability that each topic of said first set of topics is related to a particular story;
   selecting a second set of topics from said first set of topics, said second set of topics comprising the topics in the combination of topics from the first set of topics having the highest posterior probability score;
   scoring said second set of topics by summing, over said second set of topics, the probability that a particular word is related to each topic in said second set of topics, yielding summed probabilities for the second set of topics; and multiplying said summed probabilities for the second set of topics over all words in the story and then multiplying by said prior probabilities of the combination of topics in said second set of topics.

5. The method of claim 4 wherein the step of determining the probability of a particular word in a story, given a particular topic, depends on the preceding words in said story.

6. The method of claim 1, wherein said stories are stored as computer files.

7. A method of topic determination and discrimination of stories, composed of words, said method comprising the steps of:

compiling a first set of topics, said first set of topics including a set of subject topics and a general topic;

forming said general topic by automatically compiling words that are not generally associated with any particular subject;

obtaining prior probabilities for each topic in said first set of topics;

for all words in a story, determining probabilities associating each word in said story to each topic in said set of subject topics and said general topic, yielding word probabilities;

calculating individual topic probabilities from said word probabilities; and responsive to said individual topic probabilities, determining the probabilities of all possible combinations of topics from said set of subject topics associated with said story, yielding a posterior probability for each combination of topics in said first set of topics.

8. The method as defined in claim 7 further comprising the steps of:

determining that some words in said story are not related to any subject topic in the first set of topics; and determining that other words in said story are related to one or more different subject topics in the first set of topics.

9. The method as defined in claim 7 wherein determining word probabilities comprises the steps of:

performing the following steps for each combination of topics from said first set of topics;

summing, over the topics in the combination, the probabilities that a particular word is associated with each topic of said combination, yielding summed probabilities; and multiplying said summed probabilities by said posterior probability for the combination of topics, said multiplying resulting in a score for that combination of topics from said first set of topics.

10. The method as defined in claim 7 further comprising the steps of:

independently determining the probability that each topic of said first set of topics is related to a particular story;

selecting a second set of topics from said first set of topics, the probability that each topic of the second set of topics is related to said particular story exceeding a threshold;

scoring said second set of topics by summing, over said second set of topics, the probability that a particular word is related to each topic in said second set of topics, yielding summed probabilities for said second set of topics; and multiplying said summed probabilities for said second set of topics over all words in the story and then multiplying by said posterior probabilities of the combination of topics in said second set of topics.

11. The method of claim 10 wherein the step of determining the probability of a particular word in a story, given a particular topic, depends on the preceding words in said story.

12. The method of claim 7 further comprising the steps of:

determining the probabilities associating the words in said story to said general topic and to said subject topics; and based on a preset criteria responsive to said probabilities, determining a second set of subject topics chosen from the set of subject topics associated with said story.

13. A method of modeling the relationship between words and topics in stories comprising the steps of:

compiling a set of training stories;

determining a set of topics associated with at least one of said training stories;

for each training story, relating each word of said training story with each topic of said set of topics, the relating comprising forming a Hidden Markov Model for each story, said Hidden Markov Model relates, for a topic related to a given story, the expected percentage of words in said story that relates to said topic, and the probability that a given word in said story, related to a topic, is the word being considered; and maximizing the joint likelihood of the topics and words related to those respective topics in said set of training stories.

14. The method of claim 13 further comprising the steps of:

forming each state in said Hidden Markov Model as a topic contained in that story; and forming the transitions to such states as the probabilities that the words in the story are related to that topic.

15. A method of modeling the relationship between words and topics in stories comprising the steps of:

compiling a set of training stories;

determining a set of subject topics associated with at least one of said stories;

determining a general topic of words that are not associated with any subject topic; and relating each word of said training story to each topic, the relating comprising forming a Hidden Markov Model for each story, said Hidden Markov Model relates, for a topic related to a given story, the expected percentage of words in said story that relates to said topic, and the probability that a given word in said story, related to a topic, is the word being considered.

16. The method as defined in claim 15 further comprising the steps of:

forming each state in said Hidden Markov Model as a topic contained in that story; and forming the transitions to such states as the probabilities that the words in the story are related to that topic.

17. The method of claim 15 further comprising the step of maximizing the joint likelihood of the topics and the words related to those respective topics in said training set of stories.

18. An apparatus for topic determination and discrimination of stories composed of words, said apparatus comprising:

means for compiling a first set of topics, means for obtaining prior probabilities for each topic in said first set of topics;

for all words in a story, means for determining the probabilities associating each word in said story with each topic of said first set of topics yielding word probabilities;

means for calculating individual topic probabilities from said word probabilities; and responsive to individual topic probabilities, means for determining the probabilities of all possible combinations of topics from said first set of topics associated with said story, yielding a posterior probability for each combination of topics from said first set of topics.

19. The apparatus as defined in claim 18 further comprising:

means for determining that some words in said story are not related to any topic in said first set of topics; and means for determining that other words in said story are related to one or more different topics in said first set of topics.

20. The apparatus of claim 18 wherein said means for determining word probabilities further comprises:

means for summing, over the topics in the combination, the probabilities that a particular word is associated with each topic of said combination of topics from said first set of topics, yielding summed probabilities;

means for multiplying said summed probabilities by said posterior probability for the combination of topics from said first set of topics, said multiplying resulting in a score for each combination of topics from said first set of topics; and means to control the apparatus such that at the apparatus each combination of topics from said first set of topics is operated upon.

21. The apparatus as defined in claim 18 further comprising:

means for independently determining the probability that each topic of said first set of topics is related to a particular story;

means for selecting a second set of topics from said first set of topics, said second set of topics comprising the topics in said combination of topics from said first set of topics having the highest posterior probability score;

means for scoring said second set of topics by summing, over said second set of topics, the probability that a particular word is related to each topic in said second set of topics, yielding summed probabilities for the second set of topics; and means for multiplying said summed probabilities for the second set of topics over all words in the story and then multiplying by said prior probabilities of the combination of topics matching said second set of topics.

22. An Apparatus for topic determination and discrimination of stories composed of words, said apparatus comprising:

means for compiling a first set of topics, said first set of topics including a set of subject topics and a general topic;

means for forming said general topic by compiling words that are not generally associated with any subject topic;

for all words in a story, means for determining probabilities associating each word in said story to each topic in said set of subject topics and said general topic, yielding word probabilities;

means for determining individual topic probabilities from said word probabilities; and means for selecting, based on the individual topic probabilities, a second set of topics from said first set of topics associated with said story.

23. The apparatus as defined in claim 22 further comprising:

means for determining that some words in said story are not related to any subject topic in said first set of topics; and means for determining that other words in said story are related to one or more different subject topics in the first set of topics.

24. The apparatus of claim 22 wherein said means for determining word probabilities further comprises:

means for summing, over all combinations of from said first set of topics, the probabilities that a particular word is associated with each topic of said combination of topics from said first set of topics, yielding summed probabilities;

means for multiplying said summed probabilities over all said words in said story and multiplying by said prior probability of each combination of topics from said first set of topics, said multiplying resulting in a score for each combination of topics from said first set of topics; and means to control said apparatus such that each combination of topics from said first set of topics is operated upon.

25. The apparatus as defined in claim 22 further comprising:

means for independently determining the probability that each topic of said first set of topics is related to a particular story;

means for selecting a second set of topics from said first set of topics, said second set of topics comprising the topics in said combination of topics from said first set of topics having the highest probability score;

means for scoring said second set of topics by summing, over said second set of topics, the probability that a particular word is related to each topic in said second set of topics, yielding summed probabilities for the second set of topics; and means for multiplying said summed probabilities for the second set of topics over all words in the story and then multiplying by said prior probabilities of the combination of topics matching said second set of topics.

26. Apparatus for modeling the relationship between words and topics in stories, the apparatus comprising:

means for compiling a set of training stories;

means for determining a set of topics, said topics comprising a set of subject topics associated with at least one of said training stories and a general topic of words that are not associated with any subject topic, associated with each of said stories; and means for relating each word of each training story with each topic of said set of topics, the means for relating comprising means for forming a Hidden Markov Model for each story, said Hidden Markov Model relates, for a topic related to a given story, the expected percentage of words in said story that relates to said topic, and the probability that a given word in said story, related to a topic, is the word being considered.

* * * * *

UNITED STATES PATENT AND TRADEMARK OFFICE
CERTIFICATE OF CORRECTION

PATENT NO. : 6,185,531 B1
DATED : February 6, 2001
INVENTOR(S) : Richard M. Schwartz, et al.

It is certified that error appears in the above-identified patent and that said Letters Patent is hereby corrected as shown below:

Column 6,
Line 30, insert "calculating individual topic probabilities from said word probabilities;"

Signed and Sealed this

Sixth Day of November, 2001

Attest:

NICHOLAS P. GODICI
*Attesting Officer*     *Acting Director of the United States Patent and Trademark Office*